United States Patent [19]

Lawser

[11] 4,310,727
[45] Jan. 12, 1982

[54] METHOD OF PROCESSING SPECIAL SERVICE TELEPHONE CALLS

[75] Inventor: John J. Lawser, Holmdel, N.J.

[73] Assignee: Bell Telephone Laboratories, Incorporated, Murray Hill, N.J.

[21] Appl. No.: 117,829

[22] Filed: Feb. 4, 1980

[51] Int. Cl.³ ............ H04M 3/42; H04M 7/06; H04Q 3/70; H04Q 3/72

[52] U.S. Cl. .................. 179/18 B; 179/18 D; 179/18 FH

[58] Field of Search ............ 179/5.5, 18 FH, 18 B, 179/18 D, 18 C, 18 BF, 18 BC, 18 BA; 370/62, 61

[56] References Cited

U.S. PATENT DOCUMENTS

| | | | |
|---|---|---|---|
| 3,412,211 | 11/1968 | Abert et al. | 179/18 FH |
| 3,597,544 | 8/1971 | Kennedy | 179/18 C X |
| 3,641,276 | 2/1972 | Keller et al. | 179/18 BF |
| 3,881,060 | 4/1975 | Connell et al. | 179/5.5 |
| 3,975,595 | 8/1976 | Berube et al. | 179/18 BA |
| 4,162,377 | 7/1979 | Mearns | 179/18 D |
| 4,191,860 | 3/1980 | Weber | 179/18 B |

*Primary Examiner*—Thomas W. Brown
*Attorney, Agent, or Firm*—F. W. Padden; J. W. Herndon

[57] ABSTRACT

A method is disclosed of processing telephone calls with customized services in a telephone system with CCIS (Common Channel Interoffice Signaling) in which all offices are not required to have CCIS capability. The entitlement of a call to customized service is verified by transmitting from an action control point (TSPS 13) via CCIS (15, 16, 17, 19) a data message identifying calling and called entities. The message is transmitted to a data processing facility (19) associated with the terminating office (14). If the call is so entitled, a fictitious number (44) is assigned to the call and returned to the action control point. The fictitious number is stored at the data processing facility with the called entity identification. The call is completed from the action control point using the fictitious number. Upon receipt of the call directed to the fictitious number, the terminating office obtains the identity of the called entity from storage and completes the call with customized service.

10 Claims, 8 Drawing Figures

DIRECTORY NUMBER TRANSLATION TABLE (DNTT)

| OFFICE CODE | DIRECTORY NUMBER | CALL FWDG. | LINE EQUIPMENT NO. | CUSTOMIZED SERVICES |
|---|---|---|---|---|
| 526 | 6789 | 0 | XXXXXX | XXXX |
| 45 | 46 | 48 | 47 | 49 |

CALL SCREENING TABLE (CST)

| ENTRY | PERMITTED SERVICES | | CALL WAITING / CALL FWDG (50/55) | PRI RING / AA'S & REC (51/56) | AUTO COLL / CALL DIST (52/57) | CALLING LINE ID / CALLING LINE REC (53/58) | SPI / CALL ACCEPT (54/59) |
|---|---|---|---|---|---|---|---|
| 0 | 201-526-6789 | | | | | | |
| 1 | AREA CODE 201 | OFFICE CODE 582 | 1 | 0 | 0 | 0 | 0 |
| | LINE NUMBER 4258 | | 0 | 0 | 0 | 0 | 0 |
| 2 | 415 | 445 | 1 | 1 | 0 | 0 | 0 |
| | 3030 | | 0 | 0 | 0 | 0 | 0 |

FIG. 8

FICTITIOUS NUMBER TABLE (FNT)
OFFICE CODE 526

| ENTRY | | | | | CUSTOMIZED SERVICES |
|---|---|---|---|---|---|
| 0 | | | | | |
| 1 | 1 | 1000 | 6789 | 11:25:00 AM | |
| | 40 | 44 | 41 | 42 | 43 |
| P | ACTIVITY FLAG | FICT. LINE NO. (44) | CALLED STAT. LINE NO. (41) | TIME OF ASSIGNMENT (42) | |

METHOD OF PROCESSING SPECIAL SERVICE TELEPHONE CALLS

TECHNICAL FIELD

This invention relates generally to communication call processing and to a method for providing customized call services to subscribers by means of the CCIS (Common Channel Interoffice Signaling) system. In particular, the invention pertains to a method of verifying the entitlement of calls to customized call treatment in a telephone system in which not all offices are equipped with CCIS capability.

BACKGROUND OF THE INVENTION

Until recently, telephone signaling systems have been provided almost exclusively on a per trunk in-band basis. That is, supervisory and called address signals have been transmitted over voice facilities in the process of establishing call connections. The CCIS system was recently introduced into service for the purpose of improving the signaling capacity and flexibility for the establishment of call connections from the voice facilities of the telephone network.

The CCIS system is a data communications network interconnecting telephone offices. Telephone offices that interface with the CCIS system are said to have CCIS capability. These offices have access to data links which are routed directly or indirectly through signal transfer points (STPs), to other offices having CCIS capability. The data links may also provide access from telephone offices to centralized data bases at which may be stored subscriber data for providing such services as enhanced Inward-Wide-Area-Telephone-Service (IN-WATS), now called "800 service."

The CCIS system now in operation employs a signaling arrangement in which all data messages are dependent on the existence of a particular voice facility. That is, each signaling data message now transmitted in the CCIS system contains an identification of a voice trunk selected for a call with which the data message is associated. The voice trunk identification provides the address of the destination (switching office) of the data message. Data messages are transmitted from destination to destination as a call is progressively established. In the near future a new form of signaling, referred to as direct signaling, will be introduced. Direct signaling messages may be sent directly to a final destination and do not have to be associated with a telephone call or with a voice trunk. These messages might contain, for example, network management information.

Direct signaling will allow the introduction of a host of new calling services to telephone customers. Many of these new services may be described as customized and may depend upon identifying the calling entity (party or station) or some other call identifying characteristic which entitles the call to some type of treatment different from ordinary calls. U.S. patent application Ser. No. 113,384, filed by D. Sheinbein on Jan. 18, 1980, describes in detail how some of these customized calls might be provided. Illustrative examples of the types of customized services that are planned include selective call acceptance, selective call waiting, selective automatic callback, priority ringing, etc. In selective call acceptance, for example, a subscriber prespecifies individuals or stations from which calls may be accepted. Calls from other individuals or stations are denied. Similarly, the other selective services mentioned above are provided on the basis of prespecified calling entities.

Up to the present time, it has been considered impossible to process these types of customized calls without end-to-end CCIS signaling. That is, it has been believed that all offices involved in the routing of such a call must have CCIS capability. The Sheinbein disclosure, for example, assumes that all offices in a call connection have access to the CCIS system. The reason for this is the need of identification at the terminating office to verify the entitlement of the call to the customized service. For example, in order to apply priority ringing to a subscriber's station who leases this service, a terminating office must verify that an incoming call is from an entity the subscriber has authorized for the priority ringing. In general, the method that has been contemplated for providing this information to the terminating office is to transmit CCIS data messages between each of the offices involved in the call. The messages would identify the calling entity and the interoffice trunk on which the call is being routed. In this manner, the terminating office would eventually receive a CCIS data message identifying the trunk on which a call is arriving and the calling entity associated therewith. The terminating office would then communicate with a data processing facility, for example, to determine if the called party subscribes to some type of customized service and if so, if the calling entity is authorized for the service.

In the event that a toll office, for example, used in establishing a call does not have CCIS capability, there is no way in the above-described method for that office to notify the succeeding office of what outgoing trunk is selected for the call. Even if the succeeding office has CCIS capability and is given a call identification by a data message from a prior office, there is no way for the succeeding office to associate the identity with a particular call arriving on a voice trunk. The result is that there is no way to identify the calling entity on a call arriving at the terminating office and, therefore, no way for the terminating office to verify the entitlement of the call to custom calling service.

It is expected that CCIS custom calling services will begin to be offered to the public in the near future. Under current thinking, however, only limited service can be offered until CCIS capability is universally available in the telephone network. This universal capability probably will not be achieved for many years. The lack of universal CCIS capability is therefore a serious detriment to the rapid introduction and acceptance of many new services.

SUMMARY OF THE INVENTION

The foregoing problem is solved, and a technical advance is achieved by a method of processing customized telephone calls in a system comprising a plurality of telephone offices, voice facilities, and a data communications network interconnecting prescribed ones of the offices. A fictitious number is assigned to a call in response to a determination that the call is entitled to customized service. The fictitious number identifies the call as so entitled. The identity of the called entity is stored in association with the fictitious number. Thereafter, the call is completed to a terminating office using the fictitious number. When the terminating office receives a call directed to a fictitious number, it obtains the identity of the called entity using the fictitious number and completes the call to the called entity with customized treatment.

In a preferred embodiment, in response to a telephone call at a first one of the offices, data identifying the calling and called entities are transmitted via the data communications network directly to the terminating office. The terminating office verifies from the identifying data the entitlement of the call to customized service. If the call is so entitled, the terminating office assigns a fictitious telephone number to the call and transmits the fictitious number to the first office. The terminating office also stores the fictitious number in association with the called entity identifying data received from the first office and with data identifying the customized service to which the called entity subscribes. The first office completes the call using the fictitious telephone number. When the call to the fictitious telephone number arrives at the terminating office, the terminating office determines from the stored data whether or not the fictitious number is assigned to a call. If so, the terminating office obtains the true number of the called entity from storage and completes the call to that entity, providing whatever customized services are authorized. The fictitious number is then made available for assignment to another call.

The foregoing method identifies a call arriving at a terminating office as one which is entitled to customized service. The method achieves this without requiring that every office involved in the completion of the call be equipped with facilities for interconnecting with the CCIS network. All that is required is that the terminating office have CCIS capability and, if an interoffice call is involved, that the calling party have access to an office with CCIS capability which can determine the calling line number. The latter office is called an action control point (ACP) and may be the calling party's originating office, or if the originating office does not have CCIS capability, the ACP may be a toll office (equipped with CAMA trunks) or a traffic service position system (TSPS). The use of a TSPS as an ACP is particularly advantageous because it is accessible to virtually every telephone station in the country at the current time. Because of this universal accessibility, it is planned to rapidly provide all TSPSs with CCIS capability.

In the preferred embodiment, the fictitious numbers assigned to calls by a terminating office are spare line numbers in the office. An adequate plurality of the spare numbers are placed in a pool from which they are assigned to calls on an individual basis as needed. The ideal size of the pool of numbers for any given office is not known, as it will depend on the number of subscribers and the number of calls they receive. The size, however, is not expected to be large because the assignment of a fictitious number to a call lasts only for the time required to complete the call to the terminating office. At that time the temporarily assigned number is returned to the pool for reuse on a subsequent call.

A time audit of all numbers from the pool is performed in order to insure that the pool is not depleted by calls which are abandoned or which do not complete due to system malfunctions. When a number is assigned from the pool, the time of assignment is entered in storage with the number. Periodically, the time of assignment of all assigned pool numbers is compared to the current time; if a prescribed interval is exceeded for any given number, it is presumed that the call associated with the number has been abandoned or will not otherwise complete. In this case, the number is returned to the pool.

BRIEF DESCRIPTION OF THE DRAWINGS

The invention will be better understood from a reading of the following detailed description in conjunction with the drawings in which.

DETAILED DESCRIPTION

Figure 1:
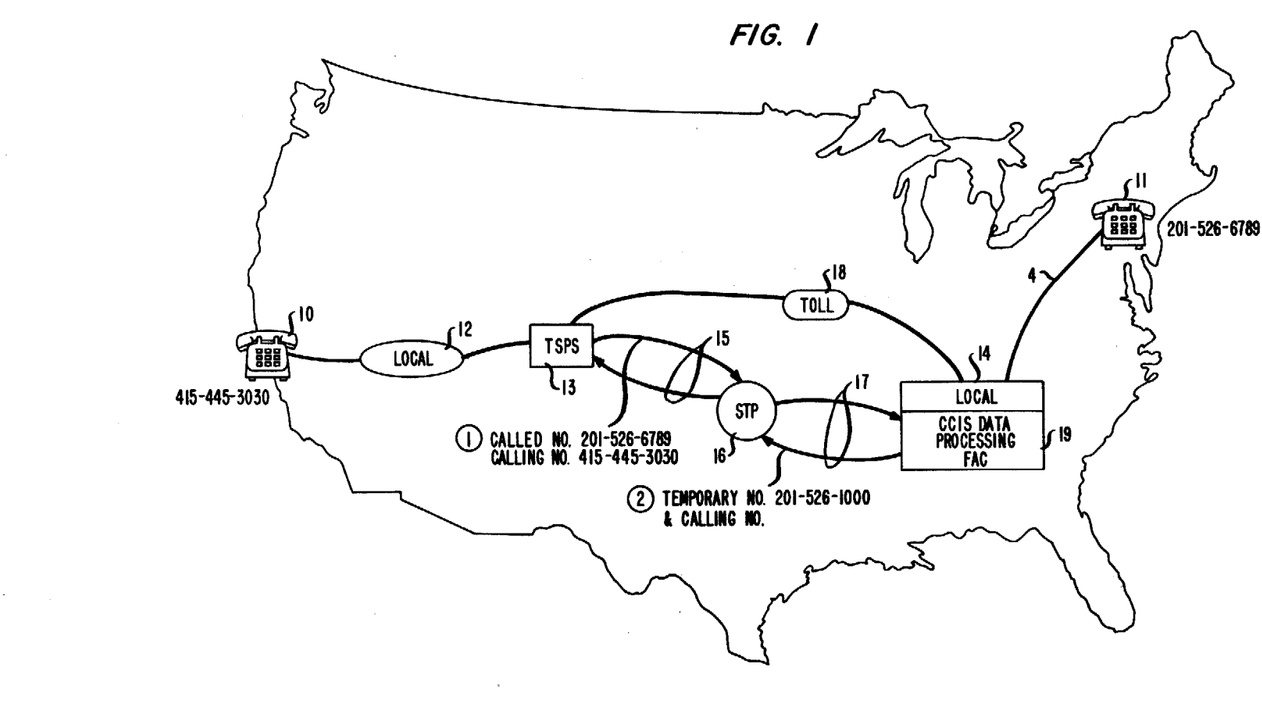
FIG. 1 shows, in block diagram form, a configuration of telephone switching offices, CCIS, and signal transfer facilities illustratively for serving customized types of calls in the United States.

With reference to FIG. 1, the method is described by assuming that a calling party A at station 10, having an area code and directory number of 415-445-3030, places a tool call to a party B at station 11. Station 11 is assumed to have an area code and directory number of 201-526-6789. It is assumed that the party B at station 11 is served by a local office 14 which has CCIS capability and that party B subscribes to selective call waiting and priority ringing service. It is further assumed that B has prespecified that calls from station 10 are entitled to priority ringing.

It is also assumed that calling and called entities are identified by respective station numbers. It is possible, however, that the entities be identified by unique personal numbers that are associated with the parties rather than with the stations. For example, in a new proposed service referred to as person locator service, telephone calls are placed to called parties by dialing personal numbers uniquely assigned to the called parties. The calls are automatically routed to stations at which the called parties are located, or in lieu of call completion, announcements indicating reasons for the unavailability of called parties may be given to calling parties. Person locator service is described in detail in U.S. patent application Ser. No. 113,383, filed on Jan. 18, 1980 by Jordan et al.

Station 10 is served by local office 12, which, it is assumed, does not have access to the CCIS system. In order to place a customized call from station 10, the call must be routed through an action control point (ACP) which, it is recalled, is an office having access to the CCIS system. By way of example, TSPS office 13 is assumed to be the ACP in this example serving local office 12. The structure and operations of a TSPS office are described in detail in U.S. Pat. Nos. 3,484,560, which issued to Jaeger et al on Dec. 16, 1979; 4,031,324, which issued to Dudonis on June 21, 1977, and 4,054,756, which issued to Comella et al on Oct. 18, 1977. TSPS is further described in 49 *Bell System Technical Journal* (December 1970) beginning at page 24.

To route the call from station 10 to TSPS 13, party A lifts the station 10 handset and keys-in the digits "0" followed by the area code 201 and directory number 526-6789 of the called station 11. The "0" directs local office 12 to route the call via TSPS 13. Local office 12 therefore seizes an outgoing trunk to TSPS 13 and transmits the keyed-in digits to the TSPS. Office 12 also ascertains the directory number of station 10 by means of its automatic number identification (ANI) equipment and transmits this to TSPS 13. TSPS 13 determines the area code of station 10 from a translation of the trunk group number on which the call arrives.

TSPS 13 formulates a data message containing the calling and called station numbers and transmits the message by means of the CCIS system to the terminating office 14. This transmittal is indicated in FIG. 1 by designation number 1. As seen, the data message is routed via data link 15 to a signal transfer point (STP) 16 and thence via data link 17 to a data processing facility 19 located at terminating office 14. Data links 15 and 17, STP 16, and data processing facility 19 form part of the CCIS system, which is essentially a packet data transmission and data processing arrangement. Packet data transmission facilities are disclosed, for example, in A. G. Fraser, U.S. Pat. Nos. 3,739,845 of July 31, 1973, and 3,979,733 of Sept. 7, 1976. The structure and operations of the CCIS system are described in the 57 *Bell System Technical Journal* No. 2, page 230 et seq.

STP 16 is a routing facility which may or may not be required in any given CCIS signaling connection. STPs other than STP 16 shown in FIG. 1 exist in the nationwide CCIS system. Their purpose is to provide economical data communication between the numerous telephone offices. An STP comprises a processor and memory facilities and a program to translate incoming data from telephone offices into the identity of the office or data processing site to which the data is to be routed. The STP is discussed in more detail in 57 *Bell System Technical Journal* No. 2, Feb. 19, 1978, page 263 et seq.

The CCIS data processing facility 19 at local office 14 includes an interface with data link 17, a feature processor (disclosed in *Bell System Technical Journal* No. 7, Feb. 19, 1977), a memory for storing variable information and programs to establish, interpret, and manage the variable information.

In the example at hand, STP 16 translates the called station digits received in the data message from TSPS 13 and recognizes that its destination is local office 14. The data message is therefore routed by STP 16 over data link 17 to the data processing facility 19 of the terminating office. In response to receipt of the message, a program at facility 19 is executed to control the operations of the feature processor. The flow of this program is diagrammed in FIGS. 2 through 6; program execution for this discussion begins at address START1 in FIG. 2. Input parameters to the program are the calling and called station numbers received in the data message.

Figure 7:
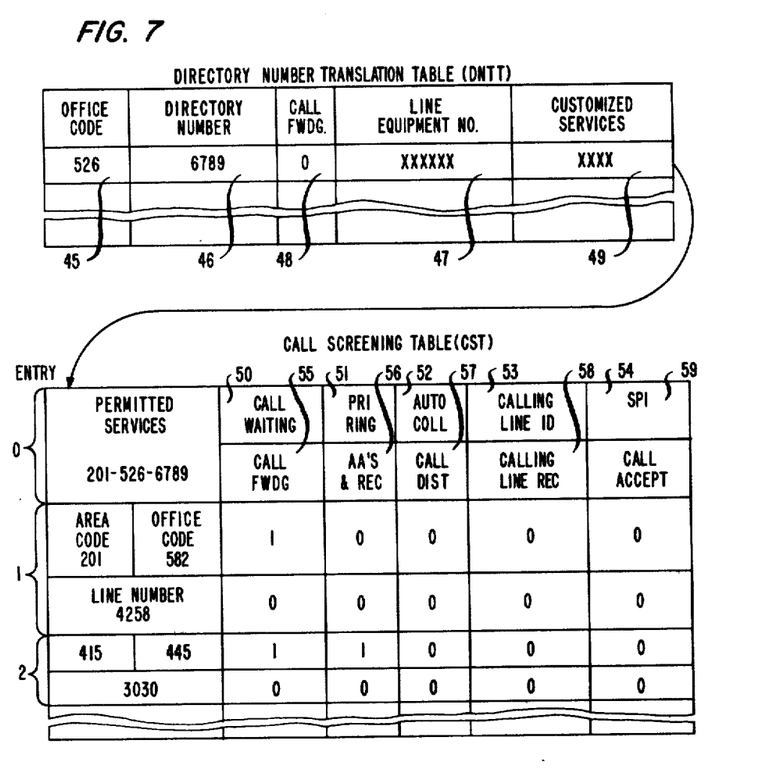
FIG. 7 shows an illustrative Directory Number Translation Table (DNTT) for one subscriber at a terminating office and among other items contains an address pointer to an illustrative call screening table (CST) associated with the station number of a subscriber to certain customized types of services. The CST table contains a list of station numbers of authorized calling stations and the services to which these stations are authorized when calling the subscriber.

The purpose of the program is to determine first if the called party B subscribes to customized services. At block 20 of FIG. 2, an attempt is made to translate the called station digits 526-6789 into an address of a memory table associated with the called station. This translation may be performed by searching an illustrative Directory Number Translation Table (DNTT) for an entry pertaining to the called station, or the translation may be performed in any other desired manner. An entry for station 11 in DNTT is shown in FIG. 7. Each entry associated with a station contains slots, such as 45 and 46, having the office code and line number of a station subscribing to customized services. The line equipment number associated with a station is included in DNTT, for example, in slot 47. In addition, DNTT also includes an indication at slot 48 of whether or not a station subscribes to non-selective call forwarding. Non-selective call forwarding means that all calls, regardless of the call originator, are forwarded to a station specified by the subscriber.

If customized treatment applies to calls to the station, an address of a table containing additional information about the customized services is stored in slot 49. For example, the DNTT entry for station 11 (526-6789) contains the address of a Call Screening Table (CST) associated with the station. One illustrative exemplary embodiment of CST is also shown in FIG. 7. A similar table exists for all stations served by local office 14 whose associated parties have subscribed to some type of customized service. As shown, the first entry O of CST pertaining to station 11 contains a plurality of indicators 50 through 59 defining the customized services to which subscriber B at station 11 has subscribed. These indicators are illustratively the same as described in the aforementioned Sheinbein patent application. A "1" in an indicator means that the specified service applies. A "0" means that the service does not appertain. Thus, under the assumption that subscriber B subscribes to selective call waiting and priority ringing, the indicators 50 and 51 of entry O are set to "1". The remaining CST entries 1, 2, etc., are each associated with a different station defined by area code, office code, and line number, which has been authorized by subscriber B to a custom service when calling station 11. Each entry 1, 2, etc., has indicators corresponding one-for-one with the indicators 50 to 59 in entry O, and these indicators indicate by their "1" or "0" states if the calling station associated therewith is entitled to the specific service. Thus, even though B subscribes to selective call waiting and priority ringing, B may authorize different calling parties to use whichever of these services he desires. For example, entry 1 is associated with a station whose area code is 201-582-4258. The selective call waiting indicator of entry 1 indicates (by its "1" state) that subscriber B has authorized that he be alerted of an incoming call from station 201-582-4258 in the event station 11 is busy when the call arrives. Calls from station 201-582-4258 are not, however, entitled to priority ringing. Entry 2 is associated with station 10 (415-445-3030) from which the call in this example originates. The customized services field indicates that calls from this station are entitled both to call waiting and priority ringing service.

In the example at hand, the translation of the station 11 directory number into a CST memory address is successful. In the event that the called station did not subscribe to customized service, the translation would fail. This would mean that the call should be processed in a conventional manner just as any other oridinary call. The data processing facility 19 at office 14 would transmit a data message containing the calling number and the true called number (201-526-6789) to TSPS 13 via the CCIS system. This is shown at block 21 in FIG. 2. TSPS 13 would complete the call using the called number returned from the data facility. The call would be forwarded over the voice network and processed by local office 14 in a conventional fashion without any type of customized treatment.

Since the translation of the called number at block 20 is successful, however, the program next searches CST, as shown at block 22, to determine if the calling station 10 has been authorized by the called party for some type of customized treatment. This search locates the calling station 415-445-3030 in entry 2 of CST.

The program at designation 23 next examines the selective call forwarding indicator of CST entry 2 corresponding to indicator 55 of entry 0 to determine if the calling station 10 is entitled to this service. The test for this particular customized service is performed at this time because the service is performed in a different manner than for the remaining illustrative services. If selective call forwarding applies and the calling station 10 is authorized for the service, a forwarding number (not shown) specified by B will be returned to TSPS 13, rather than a fictitious number. This latter action is shown at blocks 24 and 25 of FIG. 3.

Figure 2:
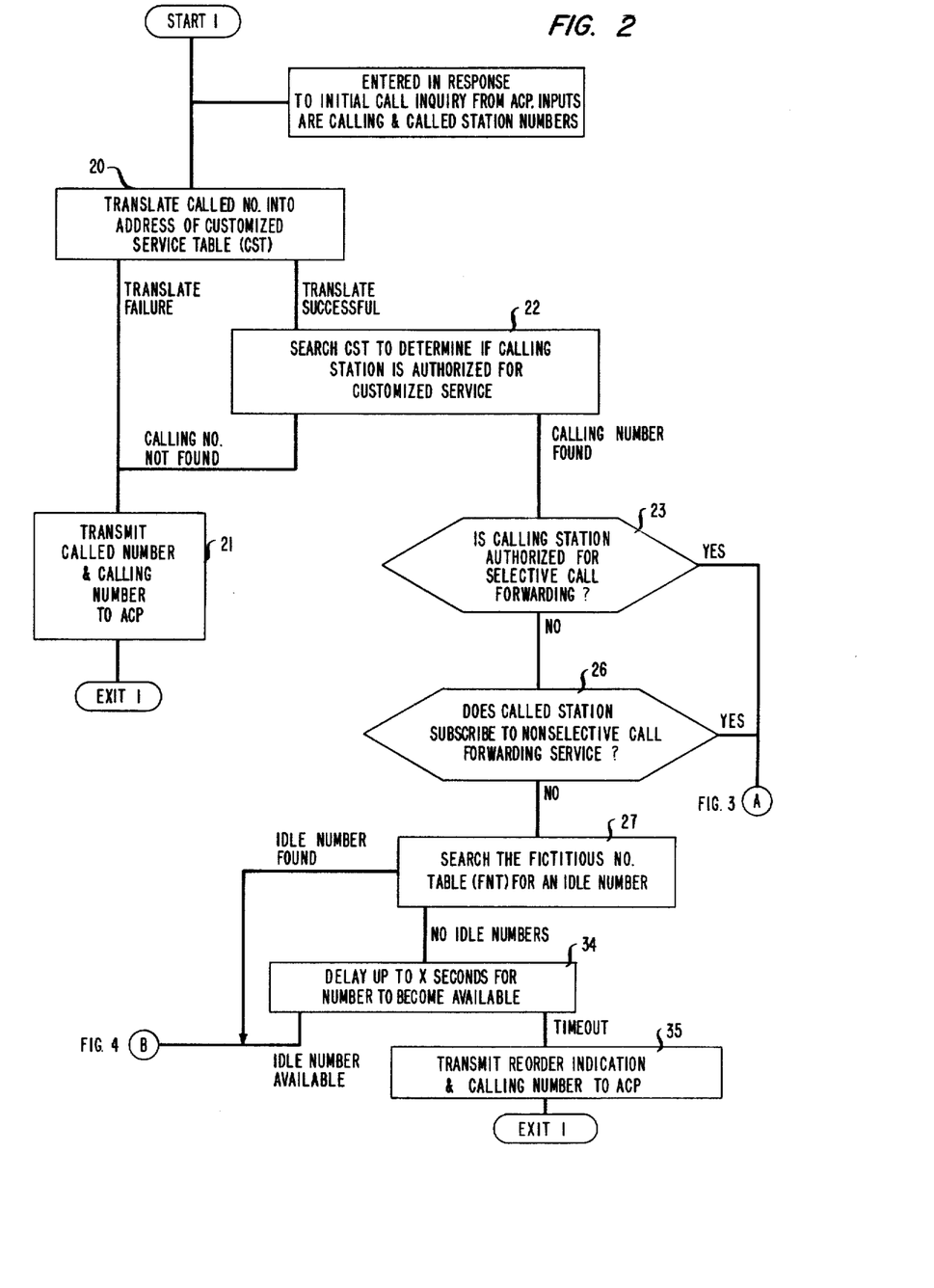
FIGS. 2 through 6 show illustrative flow diagrams of a program at a terminating office for administering the assignment of fictitious numbers to calls.
Figure 3:
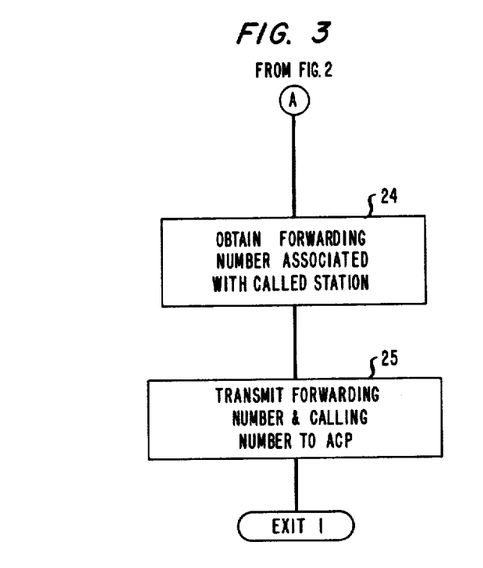
Figure 4:
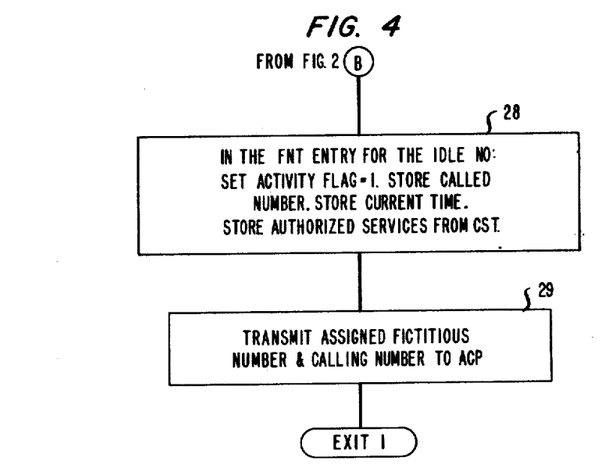
Figure 5:
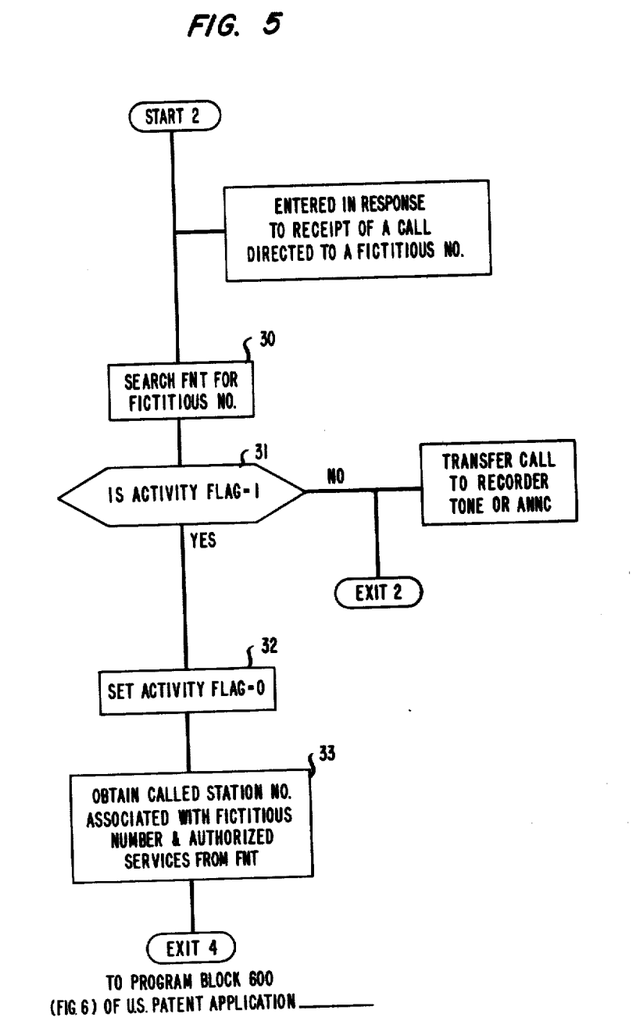

Since station 11 is assumed not to subscribe to selective call forwarding, the program proceeds to block 26 in FIG. 2 where an interrogation is made to determine if non-selective call forwarding is applicable. An indicator 48 for non-selective call forwarding is shown in the Directory Number Translation Table of FIG. 7 in the illustrative embodiment. It is recalled that non-selective call forwarding means that all calls directed to station 11 are to be forwarded to a new number specified by subscriber B. In this event, the program steps at blocks 24 and 25 of FIG. 3 would be performed.

Figure 8:
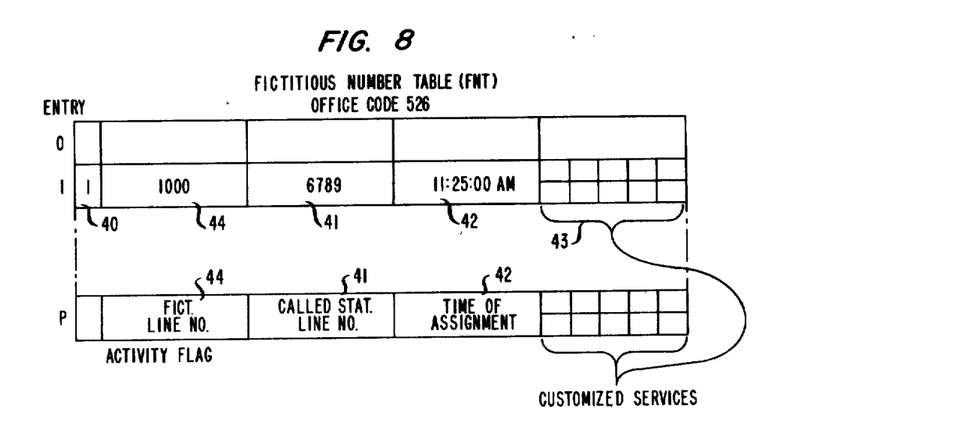
FIG. 8 shows an illustrative variable memory table constituting the pool of fictitious numbers. Each table entry associated with a fictitious number has memory slots for storing a called station number to which a pool number is assigned, a time of assignment, and an identification of the special services to which the called station subscribes.

The remaining illustrative customized services are processed by the assignment of a fictitious telephone number to identify a call as authorized. In accordance with the invention, at block 27, the program searches the fictitious number table (FNT) for an idle fictitious number to assign to this call. An illustrative FNT for local office 14 is shown in FIG. 8. The FNT has a plurality of entries 0 through P. Each entry is associated with a different fictitious number. With reference to entry 1, for example, a slot 44 contains the line number (1000) of one spare number in office 14 which is used as a fictitious number. Slot 40 contains an activity flag which is set to logic "1" when the associated fictitious number is assigned to a call and is set to logic "0" when the fictitious number is idle. The line number of a called station is stored in slot 41 when a fictitious number is assigned to a call. The time of assignment is stored in slot 42. Finally, the customized service indicators from the CST table are stored in slot 43 when a fictitious number is assigned.

For this discussion, it is assumed that entry 1 of FNT contains the first idle fictitious number that is found by the program in its search. The activity flag at location 40 is set to "1." The line number (6789) of the called station 11 is stored in slot 41; the current time of assignment, say 11:25:00 a.m., is stored in slot 42, and the customized service indicators from entry 2 of CST are stored in slot 43. The entire set of customized service indicators are stored in FNT rather than a code indicating a single service because two or more compatible services may be applicable to the call. These operations are shown at block 28 of FIG. 4.

Had no idle fictitious number been available at the time of the search above, the program would have begun a delay procedure illustrated at blocks 34 and 35 of FIG. 2. One way of implementing the delay procedure is to reexamine the pool for an idle number at periodic intervals extending over a prescribed time period of X seconds. If an idle number becomes available during the time period, program execution is resumed at block 28 in FIG. 4. Otherwise, at the expiration of the time period, a data message is returned to TSPS 13 indicating that reorder tone or an announcement be given to the calling party.

Since in this preferred embodiment the fictitious numbers are spare line numbers in office 14, the program forms the entire fictitious number by appending the area code 201 and the office code 526 to the selected spare line number 1000. At block 29 of FIG. 4, the full fictitious number 201-526-1000 and the calling number (415-445-3030) are returned to TSPS 13 in a data message. The calling number is used by the TSPS to identify the call associated with this data message. The TSPS then completes the call using the fictitious number. In this case the call is forwarded via toll office 18 to local office 14.

When the call arrives at office 14, the office attempts, in accordance with conventional practice, to translate the line number 1000 of the fictitious number into an equipment number associated with the station. The translation fails, however, because the fictitious number is a spare number. In response to the translation failure, local office 14 requests the data processing facility 19 to determine if the received number is assigned to a customized call. In response, the data processing facility executes the program at START2 in FIG. 5. At block 30 in FIG. 5, the program searches the fictitious number table FNT for an entry containing the line number portion of the received number. This search, of course, is successful since the line number 1000 is in FNT and its activity bit is set to "1." Had the search been unsuccessful or if the activity flag 40 of the fictitious number been "0," local office will be directed to transfer the call to reorder tone or to perform an appropriate announcement, or to take some other type of appropriate action. The program resets the activity flag to "0" at block 32 to return the fictitious number to the pool for subsequent use on a new call. At block 33, the program obtains the called station line number 6789 from slot 41 and the authorized service indications from slot 43 of FNT entry 1.

At this point, the program has identified the directory number of the called station 11 and the services which are authorized for the call. All that remains is to complete the call to the called station, applying the appropriate customized treatment. This final operation may be performed in a manner similar to that as shown beginning at program flow diagram block 600 in FIG. 6 of the aforementioned U.S. patent application Ser. No. 113,384 to Sheinbein. FIG. 6 and 7 of the Sheinbein application illustrate an exemplary program method of performing the final processing of the call given the called station number and the set of customized service indicators pertaining to the calling and called stations. By way of example, the program START2 in FIG. 5 of this application exists to program block 600 in FIG. 6 of the Sheinbein application with the called station number 201-526-6789 and the service indicators from the FNT as input parameters. In the instant example, the Sheinbein program recognizes that priority ringing is authorized and takes the necessary steps to complete the call by applying a distinctive ringing signal to station 11.

After a fictitious number has been assigned to a call, the call may be abandoned by the calling party, or the call may remain uncompleted because of equipment malfunction and other reasons. To insure that assigned fictitious numbers are eventually returned to a pool in such circumstances, an audit is performed by the program START3 shown in FIG. 6. START3 is entered, preferably at periodic intervals, to audit the activity flags of the fictitious number table. The selection of the time period for entry to START3 is based upon the maximum reasonable time that should be allowed for a call to complete after a fictitious number has been assigned to the call. START3 might be entered, for example, at 5 second intervals.

Figure 6:
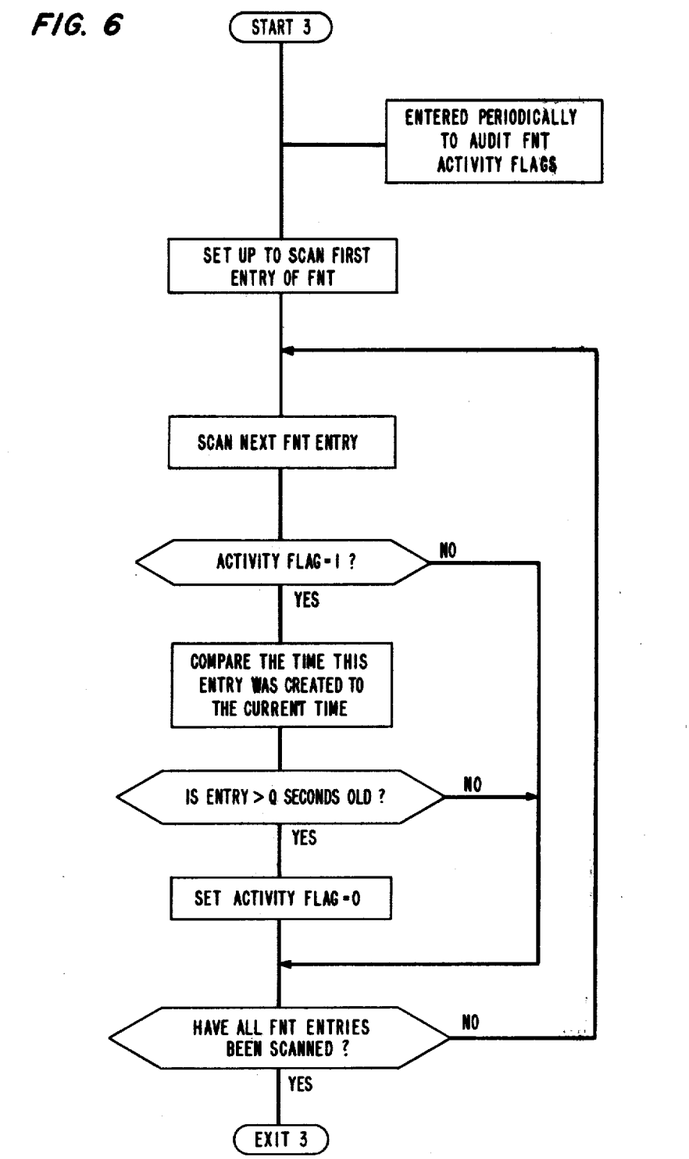

The program at START3 interrogates the activity flags 40 of each entry of FNT in succession. For each fictitious number found to be active (activity flag=1), the program compares the time the number was assigned, as stored in slot 42 of the entry, to the current time. If a fictitious number has been assigned for at least a prescribed time interval Q, it is presumed that the call with which the number is associated will not be completed. The activity flag is accordingly set to "0" to return the number to the pool of idle numbers. Since the great majority of calls today are completed or given announcements in 25 seconds or less, a reasonable time for Q appears to be in the order of 30 seconds.

In the foregoing discussion, it has been assumed that data processing facility 19 is located with and effectively a part of local office 14. Although this is the simplest and preferred embodiment of the arrangement, this relationship between local office and data processing facility is not required. For example, one embodiment might comprise a centralized data base in which the customized service data and fictitious number pools are maintained for a number of local offices. This embodiment would require that a local office served by the data base communicate with the data base by data messages so that the local office could determine if a fictitious number received on a call was properly assigned to the call and so that the local office could inform the data base when to return a given number to the pool of fictitious numbers for the office, etc. Other than for obvious matters of this type, however, the two embodiments would operate essentially the same as described herein.

It is to be understood that the above-described arrangement is illustrative of the application of principles of the invention. In light of the teaching, it is apparent that other arrangements may be devised by those skilled in the art without departing from the spirit and scope of the invention.

I claim:

1. A method of processing customized telephone calls in a telephone system comprising a plurality of telephone offices, voice facilities interconnecting said offices, and a data communications network interconnecting prescribed ones of said offices, said method being characterized by the steps of transmitting call processing data via said data communications network to a data processing facility during a call directed to a called entity, temporarily assigning at said data processing facility one of a plurality of fictitious telephone numbers to said call and in response to a determination at said data processing facility that said call is entitled to customized treatment, the assigned one of said fictitious numbers serving to identify said call as so entitled, storing in a storage means of said data processing facility an identity of said called entity in association with said assigned one of said fictitious numbers, completing said call to a terminating one of said offices serving said called entity and under control of said assigned one of said fictitious numbers, obtaining at said terminating office from said storage means the stored identity of said called entity and in response to said completing of said call to said terminating one of said offices, and completing said call to said called entity with customized treatment and in response to the obtained stored identity of said called entity.

2. A method of processing customized telephone calls in a telephone system comprising a plurality of telephone offices, voice facilities interconnecting the offices, and a data communications network interconnecting prescribed ones of the offices, said method being characterized by the steps of transmitting data identifying a calling and a called entity from a first one of the offices via the data communications network to a data processing facility, verifying at the data processing facility from the identifying data the entitlement of the calling entity to customized service in calling the called entity, assigning a fictitious telephone number to the call if the calling entity is entitled to customized service, transmitting the fictitious telephone number via the data communications network to the first office, completing the call from the first office to a terminating office serving the called entity using the fictitious number, in response to receipt of the call at the terminating office, obtaining the called entity identification data from the data processing facility using the fictitious telephone number, and completing the customized call from the terminating office to a station identified by the called entity identification data.

3. A method of processing customized telephone calls in a telephone system comprising a plurality of telephone offices, voice facilities interconnecting the offices, and a data communications network interconnecting prescribed ones of the offices, said method being characterized by the steps of transmitting data identifying a calling and called entity from a first one of the offices via the data communications network to a data processing facility, verifying at the data processing facility from the identifying data the entitlement of the calling entity to customized service in calling the called entity, assigning a fictitious telephone number to the call if the calling entity is entitled to customized service, transmitting the fictitious telephone number via the data communications network to the first office, completing the call from the first office to a terminating office serving the called entity using the fictitious number, in response to receipt of the call at the terminating office, obtaining the called entity identification data from the data processing facility using the fictitious telephone number, and completing the customized call from the terminating office to a station identified by the called entity identification data, and maintaining at the data processing facility a pool of fictitious telephone numbers associated with the terminating office, and maintaining at the data processing facility a first list of stations served by the terminating office which may receive calls with customized treatment and, in association with each station entry in the first list, a different second list of stations which are entitled to customized treatment when calling the associated station in the first list.

4. The invention of claim 3 wherein the verifying step further comprises the steps of determining if a called station is in the first list and, if so, determining if a calling station is in the second list associated with the called station entry in the first list.

5. The invention of claim 4 wherein the assigning step further comprises the steps of selecting one of the numbers from the pool of fictitious numbers, and storing the called station number in association with said one fictitious number.

6. The invention of claim 5 wherein the step of obtaining the called entity identification data from the data processing facility comprises the step of locating the called station number in storage using said one fictitious number.

7. The invention of claim 6 further comprising the step of returning said one fictitious telephone number to the pool of fictitious numbers after receipt of the call at the terminating office.

8. The invention of claim 7 further comprising the step of automatically returning said one fictitious number to the pool of fictitious numbers if the call is not received at the terminating office within a prescribed time interval after assignment of said one fictitious number to the call.

9. The invention of claim 6 in which the pool of fictitious numbers comprises spare line numbers in the terminating office.

10. A method of processing a customized call at a data processing facility comprising the steps of receiving at said facility call processing data via a data communication network from a communication office during a call to a called entity, determining at said facility from the received call processing data that said call is entitled to customized treatment, temporarily assigning at said facility one of a plurality of fictitious numbers to said call in response to the determining that said call is entitled to customized treatment, storing in a storage means at said facility an identity of said called entity in association with said assigned one of said fictitious numbers, controlling via said network and said office a completion of said call to a terminating communication office serving said called entity and by using said assigned one of said fictitious numbers, obtaining at said terminating communication office from said storage means via said network the stored identity of said called entity and in response to the completing of said call to said terminating communications office, and controlling a completion of said call via said terminating communication office to said called entity with customized treatment and in response to the obtained stored identity of said called entity.

* * * * *